United States Patent Office 2,871,976
Patented Feb. 3, 1959

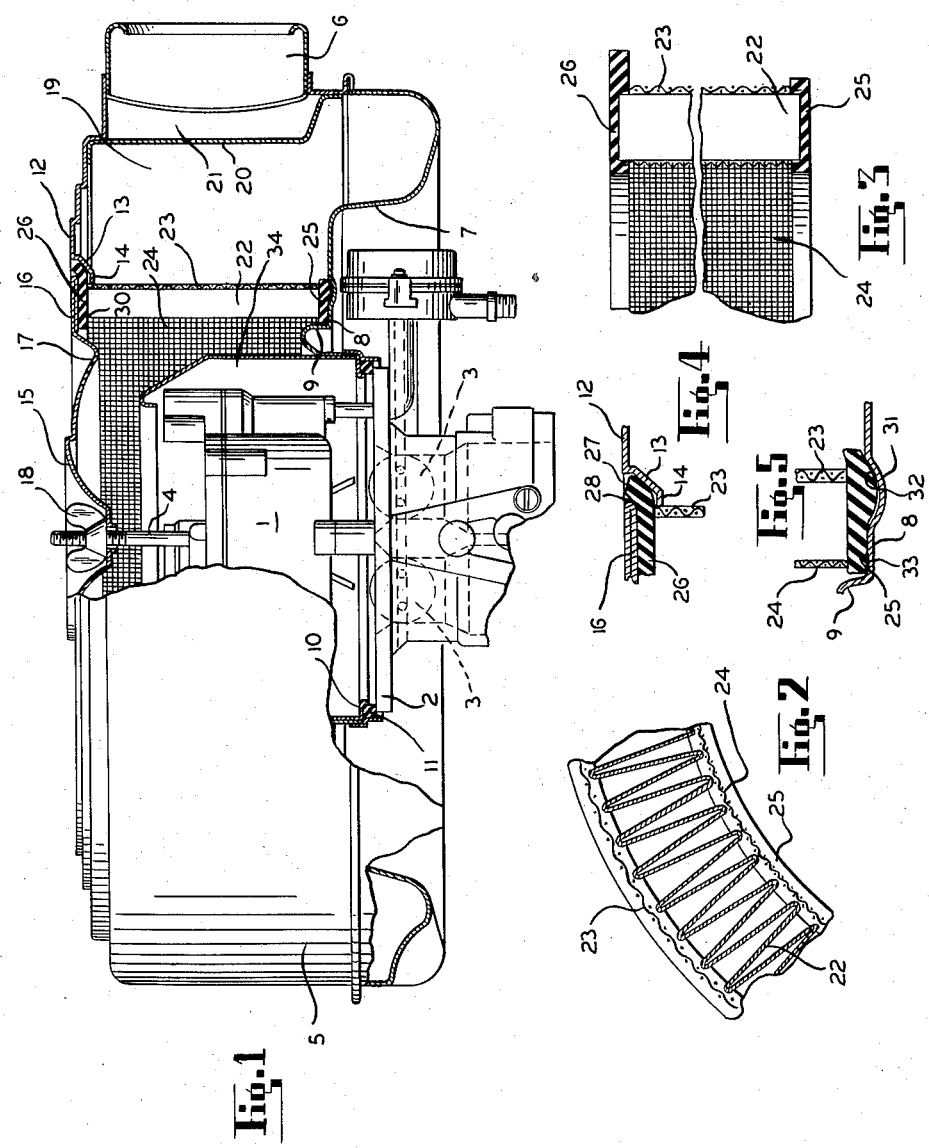

2,871,976

AIR CLEANER-INTAKE SILENCER UNIT AND FILTER ELEMENT THEREFOR

Frank Sebok, Hazel Park, Mich., assignor, by mesne assignments, to Purolator Products, Inc., Rahway, N. J., a corporation of Delaware Application March 30, 1956, Serial No. 575,025

5 Claims. (Cl. 183—44)

This invention relates to improvements in an air cleaner-intake silencer unit and filter element therefor, and more particularly to such an air cleaner and intake silencer unit as is customarily used with the air intake of a carburetor for internal combustion engines, although the invention will have other uses and purposes such as with air compressors, brake mechanisms, as well as other devices and means requiring a supply of clean air, as will be apparent to one skilled in the art.

In the past, air cleaners utilized with internal combustion engines, and particularly engines of the automotive type, embodied a filter element of the so-called dry type or were of the liquid bath type. With the so-called dry type, the filter element, usually made of wavy wire, curled cattle tail hair or the like, was initially dipped in a liquid such as a light oil and then mounted in place in the air cleaner-silencer unit. With the liquid bath type, the filter element, usually made of the same general material, was disposed above a sump containing a supply of oil, and during operation oil was carried into the filter mass by the traveling air. In neither of those instances was the filter element replaceable, but the same was dipped into some cleansing solution such as gasoline at periodic intervals and replaced in the unit.

Now the trend is toward a completely dry filter element, and one which after reaching a certain degree of contamination is replaced with a new element. Consequently, it is necessary that the unit be so arranged that the filter element itself is readily removable and replaceable, and yet when in operating position is effectively sealed against by-passing of contaminated air. Difficulty has heretofore been experienced in effectively mounting the unit in position, acquiring the necessary seal at each end of the unit, and still provide a structure from which an operator may remove and replace a filter unit with a minimum of effort and with the actuation of a minimum number of parts. Heretofore, also, where such a filter element was utilized in a unit embodying both an air cleaning arrangement and an intake silencing arrangement, separate sealing means had to be utilized to effect the proper seal around the unit as well as effect a proper seal within the casing or between the cover and the casing for structure separate and apart from the filter element itself. It has been proposed to utilize resilient end caps upon the filter element, and effect a seal by virtue of the resiliency of those end caps, but with the so-called "mushroom" type cleaner and silencer unit, a removable cover must be provided through which the filter element may be removed and replaced, and with a silencer chamber of the character now in use, other seals besides the end caps of the filter element were necessary in order to effect a complete air tight closure of the whole cleaner-silencer unit. With the foregoing in mind, it is an important object of the instant invention to provide an air cleaner and intake silencer unit so constructed that the only gasket needed in the entire assembly is around the clean air outlet, or where connection is established between the cleaner and silencer assembly and the device requiring the supply of clean air.

Another object of the invention resides in the provision of an air cleaning and intake silencing assembly, wherein the air cleaning element itself effects not only the essential seal between itself and the cover for the casing, but also provides an adequate seal for the silencing or attenuating chamber within the casing.

Another feature of the invention resides in the provision of an air cleaning and intake silencing assembly equipped with an air filter so constructed that the mere removal of the casing cover, the insertion of the air cleaning element, and the replacing of the cover effects all necessary sealing of parts except for the outlet connection of the assembly with the device requiring a supply of clean air.

It is also a feature of this invention to provide an air cleaning and intake silencing assembly embodying a casing and an air filtering element, the casing providing a seat for the element, and the element being so constructed as to coact with the casing cover and provide in effect a double seal at each end of the filter unit.

Still a further feature of the invention resides in the provision of an air cleaning and intake silencing assembly embodying a removable and replaceable filter element, and wherein it is only necessary for the operator to manipulate one simple thumb nut or the equivalent in order to replace the filter element and effect adequate sealing throughout the assembly.

Also an object of this invention is the provision of an air cleaner and intake silencer assembly embodying a casing so constructed as to compensate for manufacturing inaccuracies, such as tolerances in the air cleaning element itself; the casing structure being such that if the tolerance variations all occur in one direction or all occur in the other direction, the casing will effectively accommodate the air cleaning element and securely seal the same in position.

It is another object of the invention to provide a novel air filtering element embodying a cylindrical filter medium capped at each end by a resilient material which functions as a gasket, the end cap at one end of the element being of greater size and extending outwardly or projecting outwardly farther from the filter medium itself than the cap at the other end.

A further object of the invention resides in the provision of an air cleaning or filtering element embodying a cylindrical filter medium of substantially constant diameter, exclusive of the corrugations therein, throughout, and resilient end caps upon said medium, one of said end caps being of greater diameter than the other.

Still another object of the invention resides in the provision of an air filtering element embodying a filtering medium with resilient end caps thereon, one of the end caps being of greater size than the other and functioning not only as a gasket for the filtering medium itself, but as a seal for another portion of the casing in which the element may be mounted.

While some of the more salient features, characteristics and advantages of the instant invention have been above pointed out, others will become apparent from the following disclosures, taken in conjunction with the accompanying drawing, in which—

Figure 1 is a fragmentary part central vertical sectional, part elevational view of an air cleaner and intake silencing assembly embodying principles of the instant invention, showing the same in operative association with the carburetor of an internal combustion engine;

Figure 2 is an enlarged fragmentary plan sectional view through a portion of the filter element itself;

Figure 3 is an enlarged fragmentary vertical sectional view through the filter unit itself;

Figure 4 is a fragmentary enlarged vertical sectional view of the upper portion of the filter element and associated casing illustrating how an effective seal is accomplished; and Figure 5 is a greatly enlarged fragmentary vertical sectional view through the lower portion of the filter element and its association with the casing, also illustrating how an effective seal is obtained at that end of the structure.

As shown on the drawings:

In the illustrated embodiment of the instant invention, there is shown an air cleaner and intake silencing unit associated with a carburetor 1 of an internal combustion engine of the automotive type. In this instance, the upper mechanism of the carburetor is not provided with the usual cast housing, but is effectively enclosed by the air cleaner and silencer assembly. The carburetor 1 includes the usual carbureting mechanism which is of known construction and need not be described herein. It will suffice to say that the carburetor is provided with a platform or table 2 in a lower portion thereof, preferably within the region of the choke valves indicated at 3, and it is upon this platform that the cleaner and silencer assembly is mounted, the remaining portion of the carburetor above the platform projecting into the interior of the air cleaner and silencing assembly, thereby giving a low overall height and enabling the cleaner and silencer assembly to be readily disposed beneath the hood of an automobile. It should also be noted that in this instance the carburetor itself is provided with a bolt 4 having its base fixedly secured to an upper part of the carburetor, this bolt projecting above the carburetor to facilitate attachment of the cleaner and silencer assembly to the carburetor.

The illustrated embodiment of the instant invention includes a fabricated casing 5 having an inlet conduit 6 projecting through a side wall thereof for the admission of contaminated air. The bottom of the casing turns upwardly as at 7 to provide an interior recessed portion to accommodate parts of the carburetor, and then extends laterally to provide a seat 8 for a filter element to be later described. The casing turns upwardly inside the seat 8, as indicated at 9, to provide guiding means for the proper positioning of the filter element, and then descends and merges into a gasket holding arrangement 10 for a gasket 11 which bears against the aforesaid carburetor platform 2 to effect proper sealing engagement at that point.

The top of the casing 5 extends generally laterally, with reinforcing configurations at judicious locations, and terminates inwardly in a flat portion 12 merging into an inwardly and downwardly sloping wall 13 which in turn merges into a lateral flange 14 that defines an opening in the top of the casing. It will be noted from the showing in Fig. 1, that the opening in the top of the casing is larger in diameter than the main portion of the filter element seat 8 in the lower portion of the casing, so that the filter element may be readily inserted through the top opening. For that top casing opening, a cover 15 is provided which has a circumferential marginal portion reversely bent to define a double thickness lateral flange 16, the cover as seen in Figs. 1 and 4 being of less diameter than at least the outer portion of the sloping wall 13 in the casing top. Inside the circumferential flange 16, the cover is provided with an annular groove formation 17 to permit some flexing or springing of the cover when it is placed in position. The center portion of the cover is recessed and suitably apertured to permit the aforesaid bolt 4 to extend therethrough, and a simple wing nut 18 is all that is necessary to secure the cover tightly in position upon the casing.

The casing is, of course, much larger than necessary to accommodate the air filter element alone, and this is for the purpose of providing an enlarged volume attenuating chamber 19 which effects adequate silencing of predominant noises emanating from the apparatus with which the cleaner-silencer unit is associated. Extending partially around the inside wall of the casing is an annular partition 20 or the like which defines a tube or channel 21 leading both ways from the inlet conduit 6. Entering air passes both ways through the channel or tube 21 and exits directly into the volume chamber 19 at the ends of the channel 21, and thence passes through the air filter element. The length of the partition 20, or channel 21, determines the tuning of the volume chamber 19, and in most cases the length of this partition 20 will define an arc of 120 to 180°, and preferably the center of that arc is directly opposite the inlet conduit 6. This arrangement and its functioning as a silencing medium is more fully set forth and described in the Joseph B. Sebok and Ralph E. Sendelbach copending application entitled Air Cleaner and Intake Silencer Assembly, filed February 23, 1954, Serial No. 411,612, now Patent No. 2,822,885, issued February 12, 1958.

With reference now to Figs. 2 and 3, it will be seen that the filter element comprises a tubular filter medium 22 which in the illustrated instance is shown cylindrical. This filter medium is preferably pleated paper, as clearly seen in Fig. 2, with the pleats extending longitudinally of the element or parallel with the axis of the element. Any suitable form of paper having adequate porosity may be utilized, and in many cases the paper is treated with a phenolic or other resin in order to provide adequate stiffness. Such stiffness is desirable when a filter element of this kind is utilized for oil filtration, in order to prevent the inner folds of the pleats in the central region of the element from contacting each other. An element of this character is suitable for both oil and air or other fluid filtration, but in the instance of an air cleaner the element does not become wetted to the extent it would if used as an oil filter, and it usually is not nearly as long. On the outside of the pleats, a cylinder of relatively stiff screen material, such as hardware cloths 23, is preferably utilized, while on the inside of the pleated medium, a screen 24 of lesser strength may be utilized.

Now with reference to Fig. 3, it will be seen that a resilient end cap 25 is provided for the bottom of the filter medium and a resilient end cap 26 for the top thereof. As clearly shown in this figure, the end margin of the filter medium and both screens are embedded directly in each end cap. These end caps may be made of any suitable thermoplastic material such as neoprene, a vinyl resin compound, and other suitable thermoplastic materials which are immune to the effects of oil and gasoline, and which when set provide rubber-like resiliency. Both end caps are preferably molded about the ends of the filter medium and screens so that the bond therebetween is permanent and the ends of the filter medium are completely sealed against by-passing of air over the ends of the pleated material 22 and under the respective end cap. Made of such material, the end caps function effectively as gaskets, and no additional gasket medium is necessary to provide the adequate seal at each end of the entire filter element.

Now with reference to Figs. 1, 4 and 5, it will be particularly noted that with the end cap 26 of greater diameter than the bottom end cap 25, the filter element may readily be placed in position through the opening in the top of the casing, the cover 15 having been removed, and while the end cap 25 passes readily through that opening, the outwardly projecting portion of the end cap 26 will rest upon the aforesaid sloping wall 13 of the casing top. With the filter positioned as seen in Fig. 1, the cover 15 may be placed on the casing, and tightened down against the top end cap 26 by the wing nut 18. The tightening down of the cover causes a bending of the outer circumferential portion of the top end cap 26 as indicated at 27 in Fig. 4, so that this circumferential marginal portion of the end cap establishes an effectively tight seal against the sloping wall 13, and also curves around and establishes a tight seal with the circumferal edge of the cover itself as indicated at 28 in Fig. 4. Thus, the larger end cap 26 performs the double function of providing the essential seal between the casing and the casing cover to seal off the attenuating chamber 19, and further provides adequate seal between the filter element and the cover so that by-passing of contaminated air will not occur. At the same time, as tightening of the wing nut 18 continues, the cover tends to spring or flex a bit, and thus another tight seal is established between the cover and end cap 26 at the line of the inner screen 24, as indicated at 30 in Fig. 1. I therefore have the effect of a double seal at this end of the filter element which renders the entire sealing effect much more positive.

The bottom end cap 25 rests upon the aforesaid seat 8 defined within the casing, and it will be noted particularly from the showing in Fig. 5 that there is a transversely curvate annular groove 31 in the outer portion of this seat. The groove is so positioned that the stiffer outer screen 23 will be above the outer portion of the groove, but not directly over the center of the bottom of the groove, as seen in Fig. 5. Thus, when the cover is tightened down, pressure of the cover causes a forcing of the end cap 25 into the groove as indicated at 32, establishing a very positive seal at this point. At the same time, another seal will be effectively established at the point 33 by virtue of the inner screen 24 pressing against the end cap 25 in this region. Thus, there is also provided in effect a double seal at the bottom of the filter element as well as at the top.

Where a paper filter element is utilized, the lower portion of that element may be slightly moistened by gasoline or other fuel fumes if not in some instances by a liquid fuel by virtue of the suction developed in the carburetor. It is desirable, therefore, to provide a fire wall such as indicated at 34 in Fig. 1 inside the structure to offset any adverse effects of backfire through the carburetor. In this instance the fire wall is merely a cylindrical metal baffle open at the top, but which extends well above half the height of the filter element.

From the foregoing, it is apparent that I have provided a novel filter element which, when incorporated in an air cleaner-intake silencer assembly functions to eliminate all need of extraneous sealing means except for the connection between the assembly and the device being supplied with clean air. Not only do the end caps of the filter element itself prevent by-passing of contaminated air around the filter element, but one of those end caps also effectively establishes the necessary seal between the casing and its cover to seal off the sound attenuating chamber.

The structure also provides for extremely rapid removal and replacement of the filter element itself and the structure is highly durable and economical to manufacture.

It will be understood that modifications and variations may be effected without departing from the scope of the novel concepts of the present invention.

I claim as my invention:

1. In an air cleaner and intake silencer assembly, a casing having spaced air inlet and outlet openings, said casing housing a sound attenuating chamber and having an opening in the top thereof, said top opening being defined by a depressed annular shoulder, an annular air filter insertable through said top opening, said casing defining a seat for said air filter below said top opening, said filter having a resilient top end cap of sufficient diameter to extend over said shoulder, a cover for said top opening of less diameter than said top end cap and which rests thereupon to compress said end cap and effect a seal for said attenuating chamber, and a fire wall extending upwardly inside and spaced from said filter between it and said air outlet opening.

2. In an air cleaner and intake silencer assembly, a casing having an air inlet opening and an air outlet opening spaced therefrom and in the bottom of said casing, said casing defining a volume chamber around said outlet opening and having an opening in the top thereof over said outlet opening, an air filter insertable through said top opening, a seat for said filter in said casing beneath said top opening, said casing having a sloping wall around said top opening, a resilient top end cap on said filter projecting outwardly therebeyond sufficiently to rest on said sloping wall around said top opening, a cover for said casing of less size than said filter end cap but of sufficient size to rest thereupon, and means to tighten said cover in position to cause the outer part of said end cap to bend along said sloping wall and effect a tight seal therewith and around the edge of said cover.

3. In an air cleaner and intake silencer assembly, a casing having a clean air outlet opening in the bottom thereof and a larger opening in the top thereof, a seat for a filter element in said casing around the outlet opening, said casing having a sloping wall around the top opening, a filter element insertable through said top opening, said filter element having resilient end caps of which the bottom end cap rests upon said seat and the top end cap extends beyond the filter sufficiently to rest upon said sloping wall, a cover for said top opening to bear upon said upper end cap and of less diameter than the outer edge of said sloping wall, means to tighten said cover in position to compress the lower end cap against said seat and bend the outer part of the upper end cap between the sloping wall and peripheral edge of the cover, and said casing having an air inlet opening outward of said filter element.

4. In an air cleaner and intake silencer assembly, a casing having a clean air outlet opening in the bottom thereof and a larger opening in the top thereof, a seat for a filter element in said casing around the outlet opening, said casing having a sloping wall around the top opening, a filter element insertable through said top opening, said filter element having resilient end caps of which the bottom end cap rests upon said seat and the top end cap extends beyond the filter sufficiently to rest upon said sloping wall, a cover for said top opening to bear upon said upper end cap and of less diameter than the outer edge of said sloping wall, means to tighten said cover in position to compress the lower end cap against said seat and bend the outer part of the upper end cap between the sloping wall and peripheral edge of the cover, said seat having a transversely curvate groove around the outer part thereof into which the bottom end cap is compressed to enhance the seal in that region, and said casing having an air inlet opening outward of said filter element.

5. In an air cleaner and intake silencer assembly, a casing having a clean air outlet opening in the bottom thereof and a larger opening in the top thereof, a seat for a filter element in said casing around the outlet opening, said casing having a sloping wall around the top opening, a filter element insertable through said top opening, said filter element having resilient end caps of which the bottom end cap rests upon said seat and the top end cap extends beyond the filter sufficiently to rest upon said sloping wall, a cover for said top opening to bear upon said upper end cap and of less diameter than the outer edge of said sloping wall, means to tighten said cover in position to compress the lower end cap against said seat and bend the outer part of the upper end cap between the sloping wall and peripheral edge of the cover, said seat having a transversely curvate groove around the outer part thereof into which the bottom end cap is compressed to enhance the seal in that region, said means acting against the center of said cover whereby said cover is slightly sprung to compress the inner part of said filter element between the cover and said seat and provide in effect both inner and outer seals with said end caps, and said casing having an air inlet opening outward of said filter element.

References Cited in the file of this patent

UNITED STATES PATENTS

| | | |
|---|---|---|
| 2,034,373 | Bilde | Mar. 17, 1936 |
| 2,259,938 | McLeish | Oct. 21, 1941 |
| 2,322,548 | Sigmund | Jan. 22, 1943 |
| 2,517,518 | Williams | Aug. 1, 1950 |
| 2,720,279 | James | Oct. 11, 1955 |
| 2,732,031 | Rabbitt et al. | Jan. 24, 1956 |

FOREIGN PATENTS

| | | |
|---|---|---|
| 184,406 | Austria | Jan. 25, 1956 |

OTHER REFERENCES

German application, Serial No. K17227 Ia/46c2, Nov. 24, 1955.